(12) United States Patent
Segal et al.

(10) Patent No.: US 6,859,434 B2
(45) Date of Patent: Feb. 22, 2005

(54) DATA TRANSFER SCHEME IN A COMMUNICATIONS SYSTEM INCORPORATING MULTIPLE PROCESSING ELEMENTS

(75) Inventors: Oren Segal, Kfar Saba (IL); Yaniv Avital, Mevaseret Zion (IL); Moshe Moshe, Rosh Haain (IL); Ehud Reshef, Qiryat Tivon (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 73 days.

(21) Appl. No.: 10/262,804

(22) Filed: Oct. 1, 2002

(65) Prior Publication Data

US 2004/0066765 A1 Apr. 8, 2004

(51) Int. Cl.[7] .................................................. H04J 1/16
(52) U.S. Cl. ....................................... 370/230; 370/429
(58) Field of Search ................................ 370/229, 230, 370/230.1, 231, 235, 252, 253, 329, 335, 336, 337, 342, 343, 347, 387, 412, 415, 422, 428, 429, 474, 532, 533, 534, 535

(56) References Cited

U.S. PATENT DOCUMENTS

| | | | | |
|---|---|---|---|---|
| 4,068,098 A | * | 1/1978 | Thyselius ................... 370/379 |
| 4,512,014 A | * | 4/1985 | Binz et al. ................. 370/358 |
| 5,029,160 A | * | 7/1991 | Homma ...................... 370/434 |
| 5,233,603 A | * | 8/1993 | Takeuchi et al. ............ 370/412 |
| 5,255,220 A | * | 10/1993 | Filliman ................ 365/189.04 |
| 5,365,519 A | * | 11/1994 | Kozaki et al. .............. 370/378 |
| 5,704,047 A | * | 12/1997 | Schneeberger ............. 709/235 |
| 5,768,274 A | * | 6/1998 | Murakami et al. ....... 370/395.7 |
| 5,825,767 A | * | 10/1998 | Mizukoshi et al. ...... 370/395.7 |
| 5,841,988 A | | 11/1998 | Chennubhotla et al. ..... 709/237 |
| 5,872,775 A | * | 2/1999 | Saints et al. ................ 370/342 |
| 5,926,503 A | * | 7/1999 | Kelton et al. ............... 375/148 |
| 6,052,524 A | | 4/2000 | Pauna .......................... 703/22 |
| 6,105,119 A | | 8/2000 | Kerr et al. ................... 711/219 |
| 6,128,672 A | | 10/2000 | Lindsley ....................... 710/19 |
| 6,160,803 A | * | 12/2000 | Yuen et al. ................. 370/342 |
| 6,240,094 B1 | * | 5/2001 | Schneider ................... 370/412 |
| 6,360,243 B1 | | 3/2002 | Lindsley et al. ............ 709/103 |
| 6,430,593 B1 | | 8/2002 | Lindsley ..................... 706/103 |
| 6,542,483 B1 | * | 4/2003 | Dinc et al. .................. 370/332 |
| 6,594,286 B2 | * | 7/2003 | Chen et al. ................. 370/529 |
| 6,628,633 B1 | * | 9/2003 | Mochizuki .................. 370/335 |
| 2002/0016876 A1 | | 2/2002 | Farmwald et al. | |

OTHER PUBLICATIONS

U.S. Appl. No. 10/262,691, filed Oct. 1, 2002, Eran et al.

* cited by examiner

*Primary Examiner*—Dang Ton
*Assistant Examiner*—Phuc Tran
(74) *Attorney, Agent, or Firm*—Howard Zaretsky; Zaretsky & Associates PC

(57) ABSTRACT

A novel data transfer scheme for efficiently transferring data between multiple data generating processing units in a processing element wherein each processing unit may generate data at different rates. The data output of each processing unit is multiplexed into a single data stream and written to a memory buffer. A centralized software processor such as a CPU or DSP implements a demultiplexer operative to read the contents of the input buffer, demultiplex the data and distribute it to individual unit buffers thus recreating the original data streams generating by each of the processing units. The multiplexed data stream is generated by partitioning the outputs of the data generating processing units into multiple multiplexer groups based on individual data rates. The outputs of the various groups are collected by a multiplexer and used to build a single data stream having a well-defined structure.

39 Claims, 5 Drawing Sheets

DATA TRANSFER SCHEME IN A COMMUNICATIONS SYSTEM INCORPORATING MULTIPLE PROCESSING ELEMENTS

REFERENCE TO RELATED APPLICATIONS

This application is related to U.S. Application Ser. No. X, filed Oct. 1, 2002, entitled "Information Transfer And Interrupt Event Scheduling Scheme For A Communications Transceiver Incorporating Multiple Processing Elements", similarly assigned and incorporated herein by reference in its entirely.

FIELD OF THE INVENTION

The present invention relates generally to the area of embedded systems and more particularly relates to an efficient data transfer scheme for transferring data between multiple processing elements via a centralized distribution entity.

BACKGROUND OF THE INVENTION

Many systems, especially communication systems, are constructed from a plurality of processing elements that must communicate with each other for proper operation of the system. Different processing elements may include any type of hardware circuit element, software processing device, hardware accelerator module, central processing unit (CPU), etc. For example, data output from several processing units may need to be multiplexed and communicated to different processing elements for further processing. Numerous techniques and methods for transferring data between processing elements are known in the art. Several techniques for enabling communication between two processing elements include bidirectional buses, Direct Memory Transfer (DMA) circuits, shared memories such as dual port RAMs, first in first out (FIFO) based memories, etc. When designing an embedded system, the decision of which particular technique to use typically takes into consideration several factors, including the required functionality, the cost, the resulting level of system complexity, the desired performance, etc.

Often times, however, processing elements in the embedded system comprise complex circuitry and are adapted to generate multiple output data streams from several data generating units within the system. Often, one of the processing elements in the system such as the CPU is responsible for processing the multiple output data streams alone or in combination with one or more other processing elements. The processing to be performed typically must be performed separately on the data output of each processing unit.

In order to transfer data from the multiple units, a multi-streaming interface is required between the data generating processing units and the CPU. Such an interface typically requires multiple instances of the techniques described above, e.g., multiple DMA controllers or multi-channel DMA controllers, multiple shared memories, multiple FIFOs, etc., which requires more complicated system control and increases the system cost.

As an example, a prior art shared memory scheme is described below. A block diagram illustrating a prior art example embedded system for transferring data between multiple data generating devices (e.g., a hardware module with multiple data generating units) to a software module such as a CPU using multiple buffers in a shared memory is shown in FIG. 1. The embedded system, generally referenced 10, comprises multiple generating devices 12, shared memory 14 and a CPU 20. In general, the embedded system is constructed from two main portions, namely a plurality of processing elements coupled to a central processor via a memory buffer. In this prior art example, the multiple data generating devices comprises a hardware processing element which incorporated a plurality of hardware based data generating processing units 15, labeled unit 1 through unit N. Each hardware unit generates it's own stream of data. The shared memory comprises N buffers 16, labeled buffer 1 through buffer N. The N buffers in the shared memory may be implemented in any suitable manner such as linear, cyclic, etc. The data output from each hardware unit is written into its associated buffer in the shared memory.

Data is transferred from the plurality of processing units and the CPU via the shared memory. The shared memory communicates with the CPU via the common bus 18 which functions to couple the buffers in the shared memory to the CPU. A bus arbiter (not shown) functions to coordinate the transfer of information between the multiple units and the CPU. Each hardware unit writes data to its own cyclic buffer in the shared memory. The CPU reads the hardware unit data output directly from the associated buffer.

A disadvantage of this prior art data transfer scheme is that it is costly due to the requirement of providing multiple buffers in the shared memory along with bus arbitration logic circuitry. In addition, in the case of cyclic buffers, the system control required for the proper operation of the embedded system is complicated since each buffer requires separate control circuitry for maintaining read and write pointers, etc.

In the case where the number of active hardware units and the data output rate of each unit is configurable each cycle, additional control circuitry is required increasing the system control complexity even further.

Thus, there is a need for a data transfer scheme for use in transferring data between processing elements that is more efficient and less costly that the prior art techniques. Both the data generating (i.e. source) and data receiving (i.e. sink) processing elements may be implemented in hardware, software or a combination of hardware and software. Further, the data transfer scheme should have the capability of handling the transfer of multiplexed data from multiple data generating processing units to a receiving processing element that does not require complex system control logic circuitry.

SUMMARY OF THE INVENTION

The present invention is a data transfer scheme for efficiently transferring data between a processing element comprising multiple data generating processing units and a processor comprising a demultiplexer that overcomes the disadvantages and problems associated with prior art data transfer schemes. The scheme is beneficial in any application where a communications bridge is required between multiple data sources and one or more sinks of unmatched numbers, i.e. several data sources communicating with one or more data sinks. The scheme is especially applicable for use in systems that require multiplexed data derived from a plurality of data generating sources to be transferred to several processing entities.

The multiple data generating source processing element may be implemented in hardware, software or partially in hardware and software. The source processing units comprise any entity capable of generating a data output stream such as, for example, multiple processing units in a hardware accelerator, hardware based elements, software based elements, units constructed as a combination of hardware and software, etc.

The sink processing element may be comprised of one or more modules or devices each implemented in hardware, software or a combination of hardware and software. In accordance with the invention, the demultiplexer portion of the sink processor is intended to be implemented in software. Therefore, part or all of the sink processor comprises a software execution device such as a centralized processor, CPU, one or more DSP cores, microprocessor, microcomputer, microcontroller, etc.

The data generating processing units may operate asynchronously from one another and generate output streams at different rates. Typically, the sink processing elements requires the multiple data streams to perform further processing as required by the embedded system.

The data transfer scheme of the present invention is particularly applicable to communication transceivers and particularly UMTS communications transceivers, i.e. W-CDMA transceivers adapted for User Equipment (UE). To aid in illustrating the advantages and operation of the data transfer scheme of the present invention, an example embodiment of a W-CDMA communications transceiver incorporating the data transfer scheme of the present invention is presented infra. It is appreciated by one skilled in the art that the invention is not limited to the example embodiments presented herein and in particular is not limited to use in UMTS transceivers or User Equipment, but may be applied to numerous other systems as well.

A key feature of the present invention is that rather than utilize a multi-streaming interface between processing elements that invariably are very complex to implement, the data transfer scheme of the present invention utilizes a single streaming interface. The outputs of the multiple data generating processing units are partitioned into multiple multiplexer groups based mostly on an individual unit's data rate. Each group has associated with it a single data rate. The outputs of the various groups are collected by a switch or multiplexer and used to build a single data stream having a well-defined structure.

The single stream of output data is transferred to a memory input buffer using any suitable data transfer means such as shared memory, FIFO, dual port memory, bi-directional bus, DMA, etc. The actual technique used is not critical to the invention. Software executing on the demultiplexer processor (e.g., CPU) then reads the contents of the input buffer and distributes the data to individual unit buffers for further processing. The buffers can be built either buffer by buffer or by sequentially processing the contents of the buffer. The former method of building the buffers is preferred as it is much more efficient in terms of the required system resources. When building the buffers individually, all the data associated with a particular unit is extracted from the input buffer before the next buffer is built.

The invention can be implemented in hardware, software or partly in both and functions to efficiently transfer data from a plurality of data generating processing units in a processing element to a central demultiplexing processor that distributes the data for further processing in accordance with the particular application. In the example embodiment presented infra, the source processing element comprises a co-processor adapted to implement the chip rate processing in a rake receiver incorporating a plurality of fingers, path search unit and RSSI unit. The sink processing element comprises a single centralized processor such as a CPU or DSP core. The co-processor in combination with software running on DSP core, are used in implementing a UE W-CDMA communications transceiver.

There is thus provided in accordance with the present invention, a method of transferring data from a processing element having a plurality of processing units to a centralized processor, the method comprising the steps of partitioning the plurality of processing units into one or more groups, and assigning each group a start time and a transfer rate, collecting data output from each group in accordance with each group's start time and transfer rate and multiplexing the data outputs into a single multiplexed data stream, transferring the multiplexed data stream to a memory input buffer and extracting and distributing the contents of the memory input buffer to individual unit buffers, each unit buffer associated with a different processing unit.

There is also provided in accordance with the present invention, an apparatus for transferring data from a processing element incorporating a plurality of processing units to a centralized processor comprising a data collector adapted to collect and multiplex data output from the plurality of processing units into a single multiplexed data stream, the plurality of processing units organized into a plurality of multiplexer groups in accordance with a start time and transfer rate assigned to each multiplexer group, a memory adapted to store the multiplexed data stream, a data transfer unit adapted to transfer the multiplexed data stream output from the data collector to an input buffer in the memory and software means operative on the centralized processor to organize the plurality of processing units into one or more multiplexer groups, each group being assigned a start time and a transfer rate, and to demultiplex and distribute the contents of the input buffer to unit buffers, each unit buffer associated with a different processing unit.

There is further provided in accordance with the present invention, a Universal Mobile Terrestrial Service (UMTS) User Equipment (UE) compatible communications transceiver comprising Radio Frequency (RF) circuitry coupled to an antenna, an analog front-end processor coupled to the RF circuitry, a co-processor incorporating a plurality of processing units partitioned into one or more groups, each group having associated with it a start time and transfer rate, the co-processing adapted to collect and multiplex data output from the one or more groups into a single multiplexed data stream, a memory input buffer adapted to store the single multiplexed data stream output of the co-processor, data transfer means adapted to transfer data output from the co-processor to the memory buffer and a processor programmed to demultiplex and distribute the contents of the memory input buffer to unit buffers, each unit buffer associated with a different processing unit.

There is also provided in accordance with the present invention, a method of data transfer between a processing element having a plurality of processing units and a centralized processor in a Universal Mobile Terrestrial Service (UMTS) User Equipment (UE) compatible communications transceiver, the method comprising the steps of partitioning the plurality of processing units in the processing element into one or more groups, each group assigned a start time and a transfer rate, collecting and multiplexing data output from each group in accordance with its start time and transfer rate so as to generate a single multiplexed data stream, transferring the single multiplexed data stream to a memory input buffer and demultiplexing and distributing on the centralized processor the contents of the memory input buffer to individual unit buffers, each unit buffer associated with a different processing unit.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
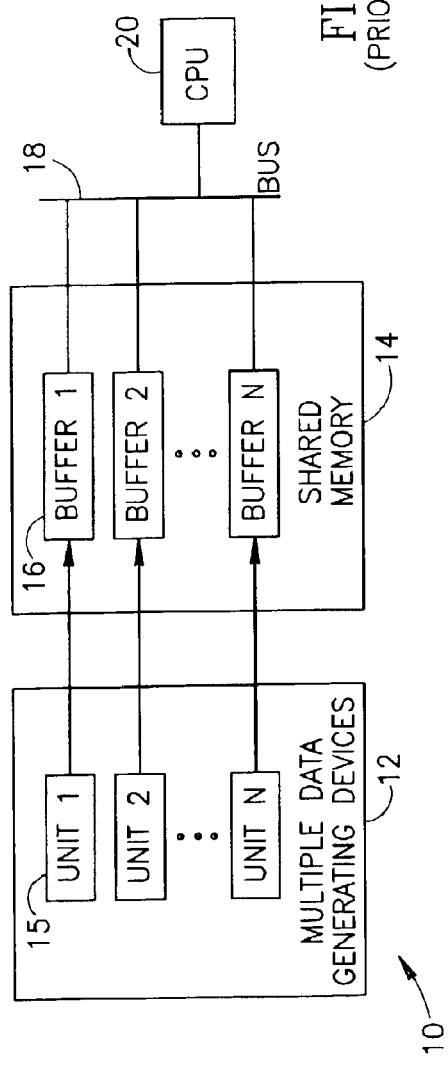
FIG. 1 is a block diagram illustrating a prior art example embedded system for transferring data from multiple data generating units to a CPU using multiple buffers in a shared memory.

The following notation is used throughout this document.

| Term | Definition |
| --- | --- |
| ASIC | Application Specific Integrated Circuit |
| BPF | Band Pass Filter |
| CDMA | Code Division Multiple Access |
| CPICH | Common Pilot Channel |
| CPU | Central Processing Unit |
| DMA | Direct Memory Access |
| DSP | Digital Signal Processor |
| FIFO | First In First Out |
| FPGA | Field Programmable Gate Array |
| IF | Intermediate Frequency |
| IRQ | Interrupt Request |
| MRC | Maximal Ratio Combining |
| PDA | Personal Digital Assistant |
| RAM | Random Access Memory |
| RF | Radio Frequency |
| RSSI | Received Signal Strength Indication |
| UE | User Equipment |
| UMTS | Universal Mobile Terrestrial Service |
| W-CDMA | Wideband Code Division Multiple Access |

The present invention is a data transfer scheme for efficiently transferring data between multiple data generating processing units in a processing element and a sink processor comprising a demultiplexing processor that overcomes the disadvantages and problems associated with prior art data transfer schemes. The scheme is beneficial in any application where a communications bridge is required between data sources and a sink of unmatched numbers, i.e. several data sources communicating with a data sink. The scheme is especially applicable for use in systems that require multiplexed data derived from a plurality of data generating sources to be transferred to a single centralized processor.

The processing units within the processing element may be implemented in hardware, software or a combination of hardware and software. The source processing units may comprise any entity capable of generating a data output stream such as, for example, multiple processing units in a hardware accelerator, hardware based elements, software based elements, units constructed as a combination of hardware and software, etc.

The sink processing element may be comprised of one or more modules or devices each implemented in hardware, software or a combination of hardware and software. In accordance with the invention, the demultiplexer portion of the sink processor is intended to be implemented in software. Therefore, part or all of the sink processor comprises a software execution device such as a centralized processor, CPU, one or more DSP cores, microprocessor, microcomputer, microcontroller, etc. Note that although the invention contemplates a software based sink processing element for performing the demultiplexer functions of the data transfer scheme, processing elements downstream therefrom coupled to the sink processor may be implemented in hardware, software or a combination of hardware and software in accordance with the particular implementation of the embedded system. Note also that throughout the document, although reference is made to a single centralized sink processor, the sink processor may be constructed as any number of devices and is not limited to a single processor.

The sink processing element may be implemented as a plurality of processing elements and comprises a centralized demultiplexing processor adapted to execute the configuration and data distribution software methods of the present invention. For example, the sink processor may comprise a CPU, one or more DSP cores, microprocessor, microcomputer, microcontroller, ASIC, FGPA, etc. Depending on the application, the sink processing element may be coupled to additional processing elements for performing further processing.

The data generating processing units may operate asynchronously from one another and generate output streams at different rates. Typically, the sink demultiplexing processor needs to receive the multiple data streams in order to distribute them for further processing as required by the embedded system.

The data transfer scheme of the present invention is particularly applicable to communication transceivers and particularly UMTS communications transceivers, i.e. W-CDMA transceivers adapted for User Equipment (UE). To aid in illustrating the advantages and operation of the data transfer scheme of the present invention, an example embodiment of a W-CDMA communications transceiver incorporating the data transfer scheme of the present invention is presented infra. It is appreciated by one skilled in the art that the invention is not limited to the example embodiments presented herein and in particular is not limited to use in UMTS transceivers or User Equipment, but may be applied to numerous other systems as well.

A key feature of the present invention is that rather than utilize a multi-streaming interface between processing elements that invariably are very complex to implement, the data transfer scheme of the present invention utilizes a single streaming interface. The outputs of the data generating processing units are partitioned into multiple multiplexer groups based mostly on an individual units data rate. Each group has associated with it a single data rate. The outputs of the various groups are collected by a switch or multiplexer and used to build a single data stream having a well-defined structure.

The single stream of output data is transferred to a memory input buffer using any suitable data transfer means such as shared memory, FIFO, dual port memory, bi-directional bus, DMA, etc. The actual technique used is not critical to the invention. The transceiver demultiplexing processor (e.g., CPU) then reads the contents of the input buffer and distributes the data to individual unit buffers for further processing. The buffers can be built either buffer by buffer or by sequentially processing the contents of the buffer. The former method of building the buffers is preferred as it is much more efficient in terms of the required system resources. When building the buffers individually, all the data associated with a particular unit is extracted from the input buffer before the next buffer is built.

Figure 2:
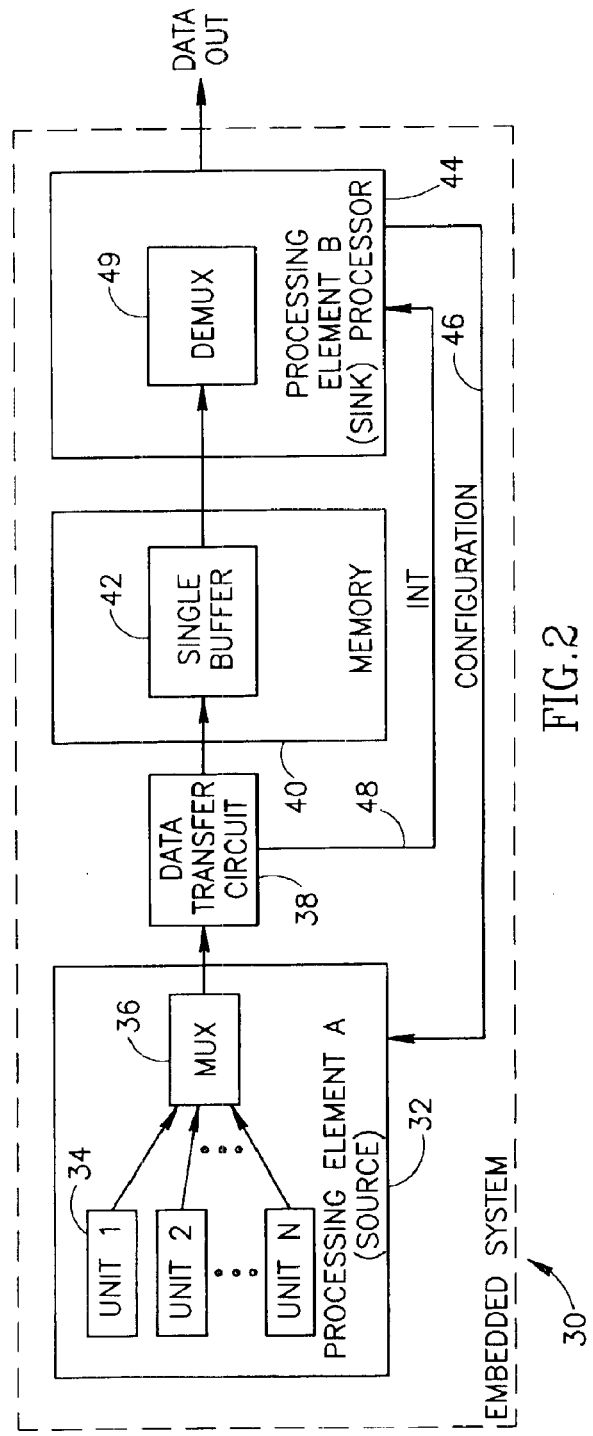
FIG. 2 is a block diagram illustrating a first embodiment of an embedded system incorporating the data transfer scheme of the present invention.

A block diagram illustrating a first embodiment of an embedded system incorporating the data transfer scheme of the present invention is shown in FIG. 2. The embedded system, generally referenced 30, comprises processing element A 32, data transfer unit 38, memory 42 and a sink processing element B 44. Processing element A comprises a plurality of data generating processing units 34, labeled unit 1 through unit N, and a multiplexer 36. The multiplexer may also be referred to as a switch or collector. The units function to generate output data wherein each unit may output data at a different rate and in an asynchronous manner.

The actual implementation of processing element A including the data generating processing units and multiplexer therein is not critical to the operation of the invention. Each may be implemented in hardware, software or a combination of hardware and software. Processing element B, i.e. the sink, comprises a centralized demultiplexing processor 49 adapted to execute the software methods of the present invention. Typically, processing element B comprises a CPU, microprocessor, microcomputer, microcontroller, DSP core or other hardware or software execution unit capable of executing software. As indicated supra, the implementation of the sink processor, other than the demultiplexer portion, may be constructed in hardware, software or a combination of both and as one or a plurality of modules, circuits or devices.

In operation, the plurality of data generating processing units (hereinafter referred to simply as units or processing units) generates individual data output streams that are collected by the multiplexer 36. The multiplexer functions to combine the data from all the units into a single data stream in according to an agreed protocol. In effect, the multiplexer operates as a switching device wherein the outputs of the units are switched onto the single output stream in a predefined, predictable and configurable manner. This allows the demultiplexer in processing element B to read the contents of the stream and associate each data item with its originating unit.

Depending on the implementation, processing element B is operative to communicate with processing element A for configuration purposes using a well-defined protocol. Processing element B, using communication link 46, is operative to configure the units and/or the multiplexer in processing element A. Thus, processing element B has knowledge of the configuration of processing element A at any instance in time and is therefore able to process the single input data stream and distribute it to the different unit buffers for further processing.

The single output stream generated by the multiplexer is transferred to a single buffer 42 in the memory 40 via a data transfer circuit 38. The data transfer circuit may comprise any suitable transfer device including but not limited to a shared memory (e.g., dual port RAM), bidirectional bus, DMA controller, FIFO, etc. The actual implementation of the data transfer circuit is not critical to operation of the present invention. The data transfer circuit is adapted to generate an interrupt signal 48 to the processor indicating that the data transfer to the memory buffer is complete and ready to be processed when a predetermined amount of data has been written to the memory buffer.

As stated supra, a key feature of the present invention is the partitioning of the units into one or more multiplexer groups. The main objective is to separate the groups based on the output data generation rates of the various units. For all units within a group, output data is read at the same rate.

A single multiplexer is operative to collect the outputs of all the units beginning at a certain start time and repeating at the particular group transfer rate. Each group has associated with it a start time and a transfer rate that are independently configurable for each group. The start time and transfer rate may be fixed or variable on a group-by-group basis. Further a unit may be active or inactive, and is configurable by processing element B. A priority setting within the groups may be configured for the situation where the multiplexer needs to collect outputs from more than one group at the same time. In this case, the outputs are collected in accordance with the priority order. In all cases, within each group, the multiplexer collects output data from all the active units in accordance with a predefined order. Note that the partitioning of the units into groups is typically performed a priori at system startup and does not change once configured.

It is important to note that the invention enables the merging of data output from different data sources into a single group rate wherein the data sources have unmatched data rates derived from a single known rate. It thus possible that a unit within a group has a different output rate than the rate assigned to its group. If the unit's rate is higher than the group rate, the unit is adapted to buffer some outputs such that the multiplexer collects them each collection time. Actual location of the buffering between the units and the multiplexer is not critical to the invention and may be implemented either at the output of the unit or at the multiplexer. If the unit's rate is lower than that of the group rate, the multiplexer is adapted to collect the same output multiple times (i.e. the output is duplicated). In this case, processing element B is operative to remove the duplicate outputs. It is important to note that processing element B must properly configure the collection of data by the multiplexer so as to ensure no overlap between groups occurs in the collection.

In accordance with the present invention, the continuous output of the units is logically partitioned into constant sized time slots. Configuration changes of the units or multiplexer may occur once per time slot, for example, at the beginning of each time slot. Note that although the configuration portion of the time slot is a minor portion of the data transfer, it enables the majority of the data transfer per time slot to be cyclic. Reconfiguration may occur at any time, although preferably it occurs at predetermined instances in time, such as at the beginning of a time slot.

In accordance with the invention, the multiplexer is adapted to generate a complete single buffer of data every time slot form the output collected from each unit. The size of the buffer is variable and may be configured each time slot. The single data stream is transferred to the memory buffer via the data transfer circuit. When the predetermined amount of data has been written to the memory buffer, the data transfer circuit generates an interrupt signal to processing element B indicating that the data transfer to the memory buffer is complete and ready to be processed. In response, processing element B reads and distributes the contents of the buffer to separate unit buffers, each unit buffer associated with a different unit.

Figure 3:
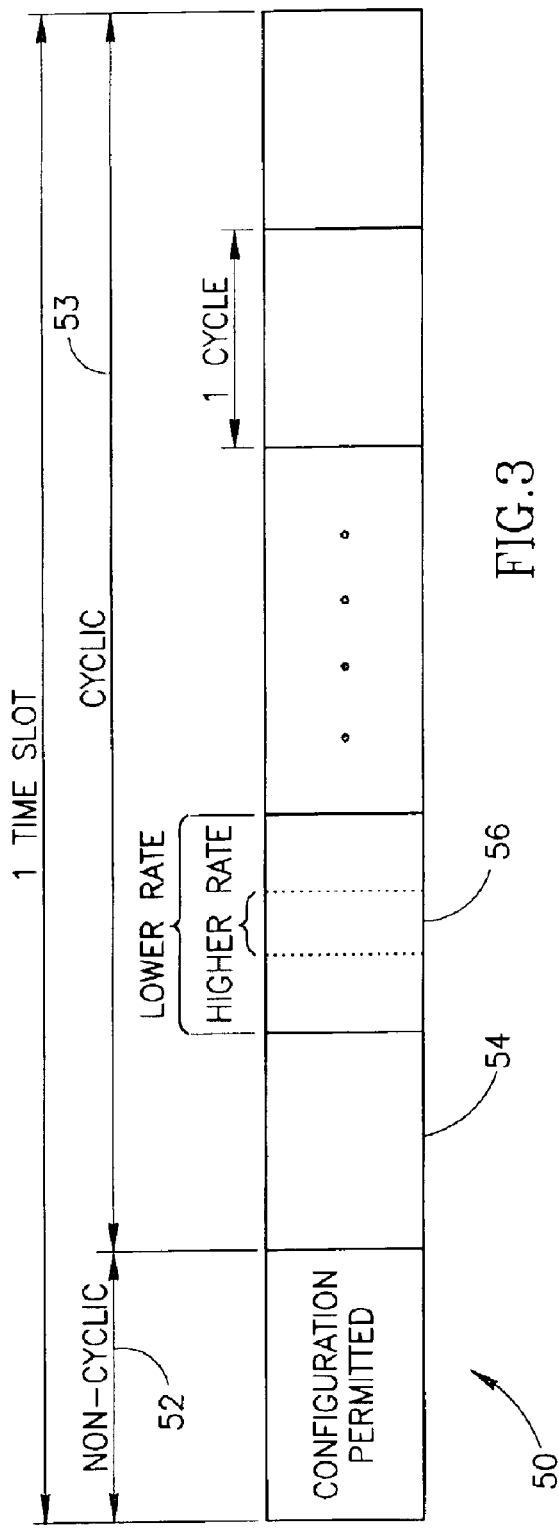
FIG. 3 is a block diagram illustrating a time slot made up of a plurality of cycles.

A block diagram illustrating a time slot made up of a plurality of cycles is shown in FIG. 3. The time slot, generally referenced 50, comprises a non-cyclic configuration portion 52 and cyclic portion 53 made up of a plurality of cycles 54. Lower rate outputs take up a larger time period while higher rate outputs take up a smaller time period (referenced 56). Since processing element A is configured once in a time slot, the majority of the contents of the buffer is cyclic meaning that the order of the outputs repeats from one cycle to the next. This allows for easier distribution of the data to the individual unit buffers. Note that the period of a group having a higher rate is preferably a multiple of a period of a group with a lower rate in order to create a cycle. If a time slot has no configuration period, the entire time slot comprises a cyclical portion only.

Figure 4:
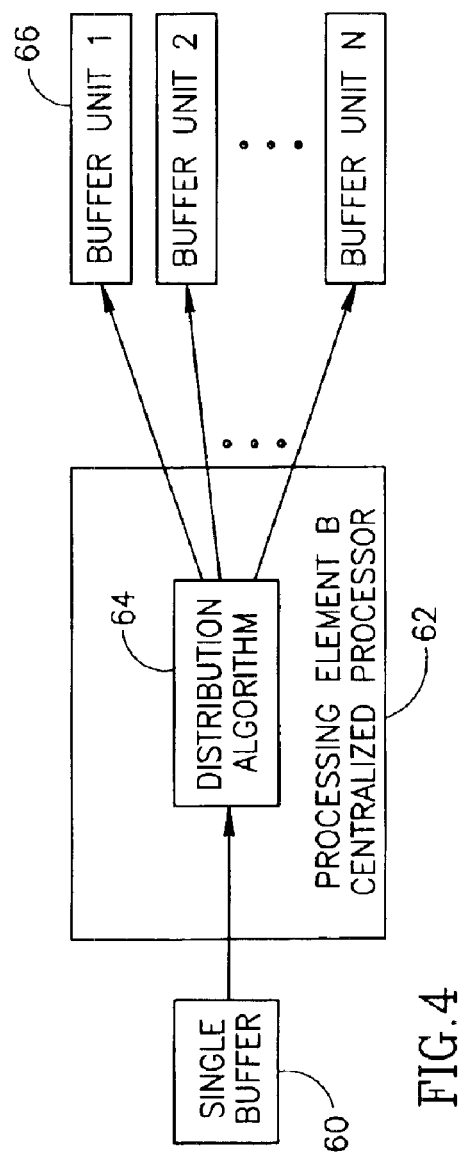
FIG. 4 is a block diagram illustrating the data distribution task performed by a distribution algorithm adapted to be executed on a centralized processor.

A block diagram illustrating the data distribution task performed by the distribution algorithm that executes on processing element B is shown in FIG. 4. Although the data distribution algorithm is intended to be performed in software, depending on the particular implementation, it may be performed using other means. For each buffer 60 of output data, the distribution algorithm 64 running on processing element B 62 is operative to distribute the contents of the buffer to the unit buffers 66, labeled buffer unit 1 through buffer unit N. Knowing the protocol and format of the single data stream, the distribution algorithm can 'de-multiplex' the data into separate buffers for each unit. Processing element B is adapted to execute software programmed to de-multiplex and distribute the received contents of the buffer to the unit buffers. The re-distribution task functions in reverse of the multiplexing operation in order to properly determine the proper unit buffer for the received data.

Figure 5:
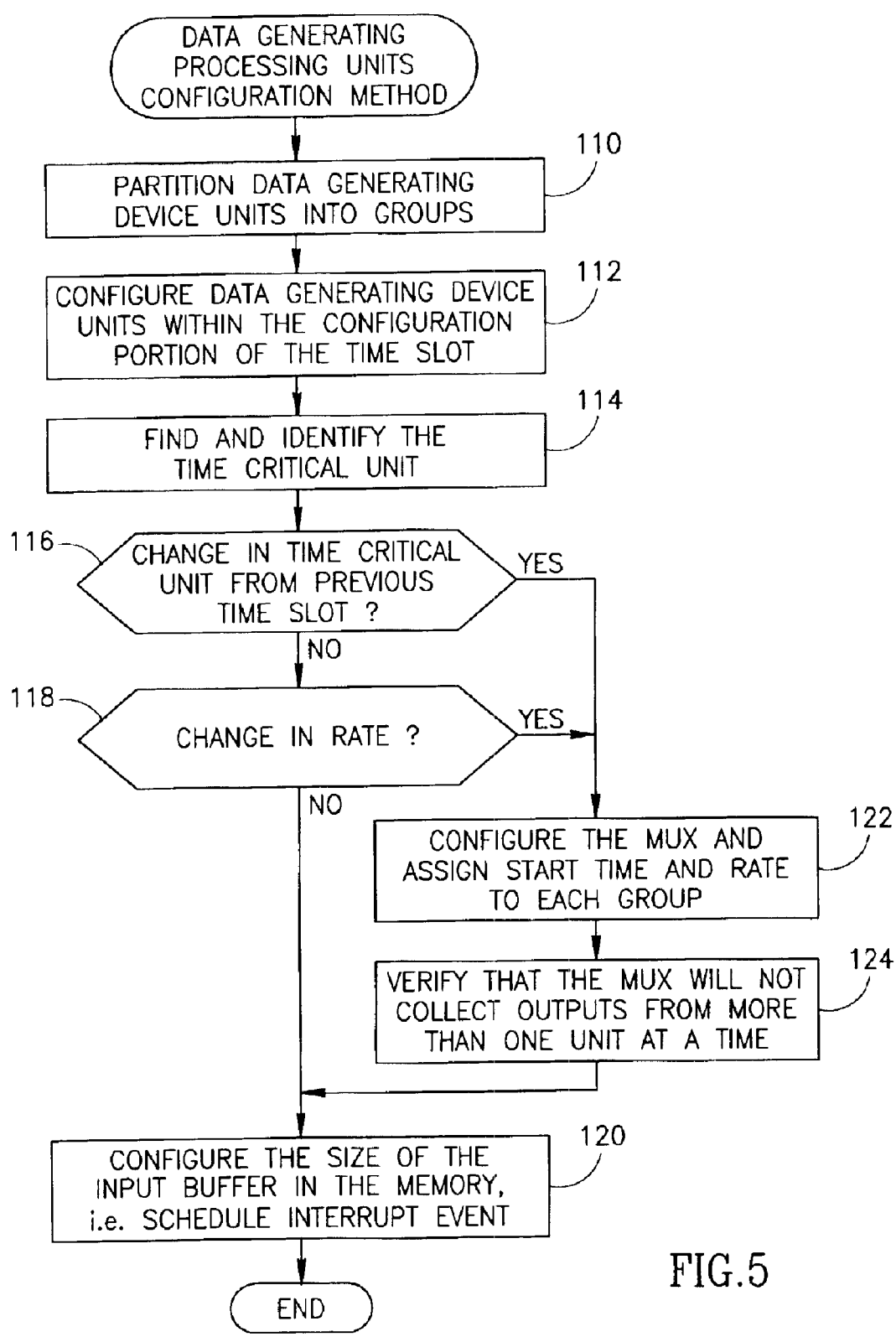
FIG. 5 is a flow diagram illustrating the data generating processing units configuration method of the present invention adapted to be executed on the centralized processor.

A flow diagram illustrating the configuration method of the present invention for configuring the data generating processing units is shown in FIG. 5. This method is performed by software adapted to be executed on processing element B, i.e. the centralized processor that functions as the data sink for the plurality of data generating units in processing element A. For example, if processing element B comprises a DSP core, the method may comprise a software driver adapted to execute on the DSP core.

In accordance with the invention, the units are partitioned into multiplexer groups (step 110). Note that his step may be performed a priori during the initial configuration of the embedded system. The units and multiplexer on processing element A are configured during the allowed configuration portion of the time slot (step 112). In order to schedule an interrupt event, the most time critical unit is found and identified (step 114). It is then checked whether there is a change in the identity of the most time critical unit from the previous time slot (step 116). If not, it is then checked if there is a change in the data rate (step 118). If not, the size of the memory input buffer is then configured (step 120). Once the size of the memory buffer is determined, the interrupt event can be scheduled.

If a change was detected in the most time critical unit from the previous time slot (step 116), the multiplexer is configured by assigning a start time and rate to each group (step 122). It is verified that the multiplexer will not collect outputs from more than one unit at a time. Note that a priority order is configured whereby one group takes precedence over others in the event output data from two or more groups would have been scheduled to be read at the same time. The priority is taken into account in determining the order of collection of output data from the units in each group.

Figure 6:
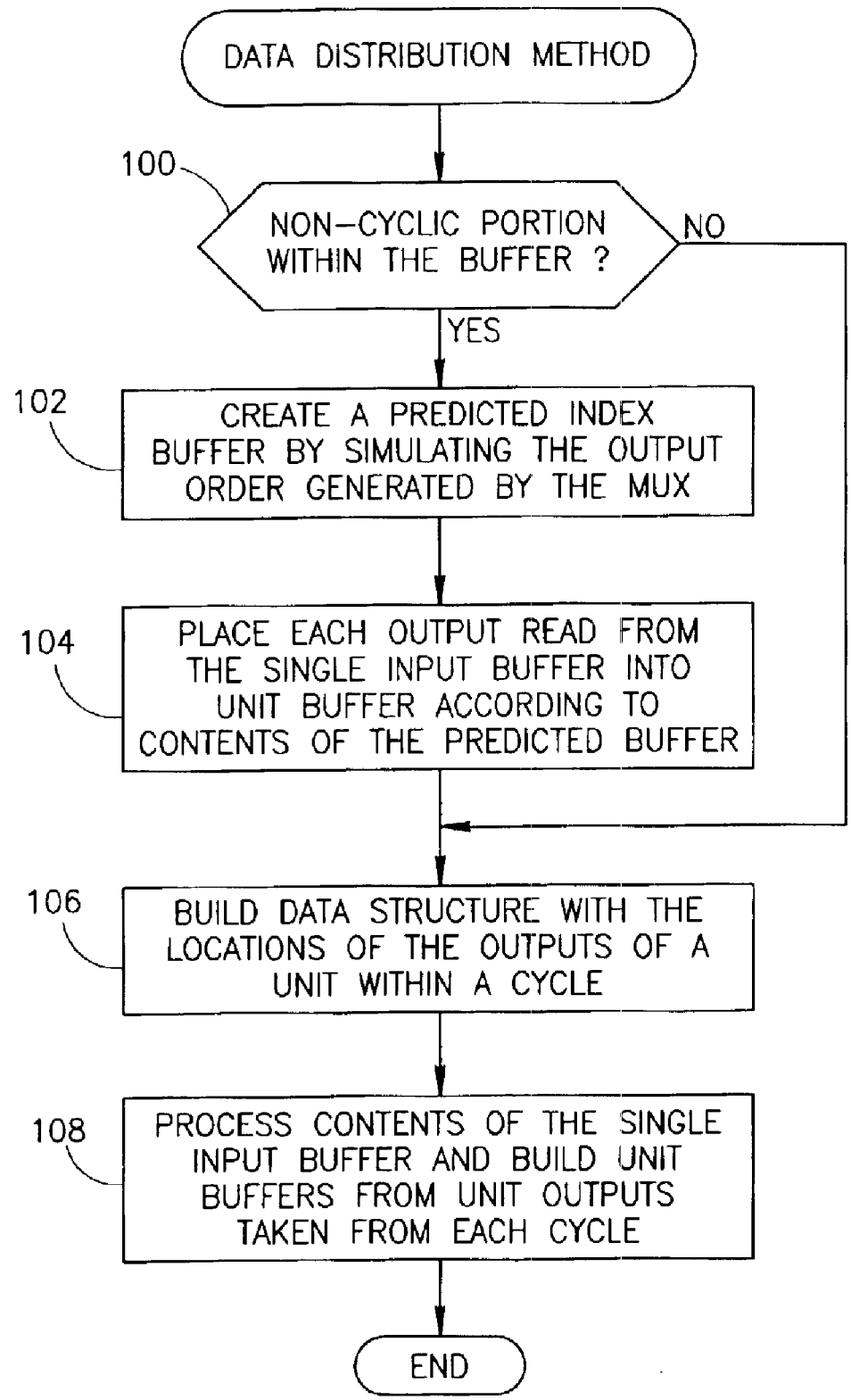
FIG. 6 is a flow diagram illustrating the data distribution method of the present invention adapted to be executed on the centralized processor.

A flow diagram illustrating the data distribution method of the present invention is shown in FIG. 6. Similarly to the method of FIG. 5, this method is implemented as software adapted to be executed on the centralized processor B. This method is performed each time slot upon receipt of an interrupt indicating that the data transfer to the memory buffer is complete. It is first determined whether there is a non-cyclic portion within the buffer (step 100). If not, a data structure of the locations of the outputs of a unit within a cycle is built (step 106). The data structure comprises information about the cyclic pattern of the occurrences of output data in the single output stream generated by the multiplexer. Using this information, the method efficiently builds a separate buffer for each unit. Such a data structure can be built since the format of the single data stream is known. Although the actual timing of the building of the data structure is not critical, it is preferable that it be built immediately after the configuration method described supra in connection with FIG. 5. In the event there is no configuration change, the previously built data structure is used and extended to cover the complete current configuration period.

The contents of the single input buffer are then processed and unit buffers are built from unit outputs taken from each cycle (step 108). In this embodiment, the individual unit buffers are completely filled one after another. Thus, all the output data from a particular unit is extracted from the input buffer and stored in the individual unit buffer before proceeding to the next unit buffer. Since the software has knowledge of the structure of each cycle within the time slot, it knows where to find output data for a particular unit within each cycle.

In an alternative embodiment, the unit buffers are built simultaneously in parallel wherein the contents of the input buffer are extracted sequentially and distributed to its associated unit buffer. Note, however, that the former alternative of building the unit buffers individually is significantly more efficient and is the preferred technique for generating the unit buffers.

If a non-cyclic portion is contained within the buffer (step 100), the software is operative to create a predicted index buffer (step 102). Each unit is assigned a unique index. The predicted index buffer is created by simulating the output order generated by the multiplexer in processing element A. The index corresponding to each unit is stored in the predicted index buffer in accordance with the simulated output order generated. The operation of the multiplexer is simulated in order to determine the unit buffer order. Each index points to a particular unit buffer that the multiplexer actually reads output data from. Each output value read from the input buffer is written into a particular unit buffer in accordance with the contents of the predicted index buffer (step 104). In this fashion, the data can be de-multiplexed and properly distributed for the non-cyclic configuration portion of the time slot.

Figure 7:
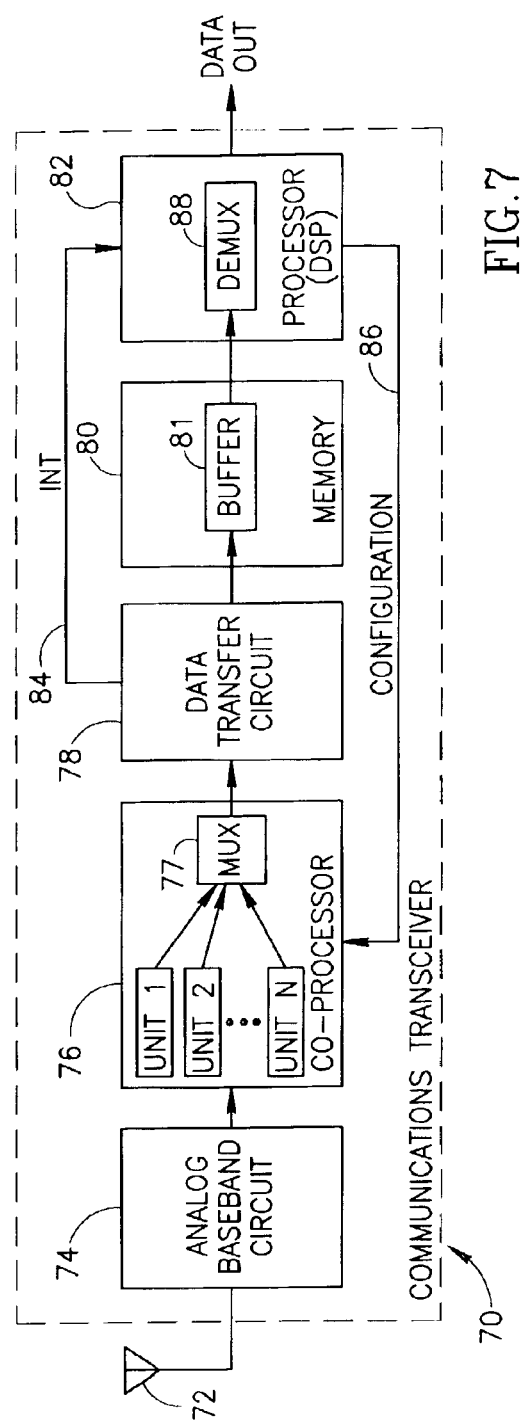
FIG. 7 is a block diagram illustrating an example application of the data transfer scheme of the present invention in a W-CDMA transceiver.

An example is presented hereinbelow illustrating the application of the present invention to a W-CDMA communications transceiver. The example is applicable for use in a Universal Mobile Terrestrial Service (UMTS) based User Equipment transceiver. A block diagram illustrating an example application of the data transfer scheme of the present invention in a W-CDMA transceiver is shown in FIG. 7. The communications transceiver, generally referenced 70, represents a generalized block diagram of a UMTS based UE W-CDMA transceiver. In this example embodiment, processing element A of FIG. 2 is implemented as a co-processor adapted to perform the chip rate processing of the transceiver including the rake receiver plurality of fingers, path search unit and RSSI unit. Processing element B including the demultiplexing processor may be implemented as one or more DSP cores executing software adapted to perform the methods of the present invention.

The transceiver is electrically coupled to an RF antenna element 72. The received RF signal is processed by the analog baseband circuitry 74 that comprises, among other components, an RF front-end circuit, filters and A/D converters. In operation, the antenna receives a spread spectrum RF signal transmitted by one or more W-CDMA base stations. The RF front-end circuit receives the RF signal from the antenna and processes it. Several functions are performed by the RF front-end circuit depending on the particular implementation. For example, typical functions include a first downconversion from RF to IF, band pass filtering (BPF) to reject out-of-band interference and noise, a second downconversion from IF to baseband including splitting the signal into in-phase and quadrature phase (i.e. I and Q) components and matched filtering to match the pulse shape of the transmitted signal. It is noted that subsequent processing is adapted to handle the I and Q (complex) output of the RF front-end circuit. The received samples are then digitized and output to the hardware accelerator module 76.

One alternative to the super heterodyne downconversion scheme described above is a direct conversion scheme wherein the use of an IF oscillator is avoided and the RF from the antenna is mixed directly down to DC. Either scheme may be used with the direct conversion more typical of modern W-CDMA RF front-end designs. In addition, other RF schemes may be used without departing from the scope of the present invention.

The co-processor is adapted to receive the samples from the analog baseband circuit and perform chip-rate processing on those samples. The co-processor comprises N demodulation fingers units, N Common Pilot Channel (CPICH) finger units a path search unit and a Received Signal Strength Indication (RSSI) unit. Each unit outputs data at a different rate. One of the main functions of the co-processor is to implement the rake receiver fingers for handling received multipath signal components. The digitized samples first pass through a matched filter also implemented in the co-processor. The output of the matched filter is then input to the rake receiver fingers which function to de-spread the received signal. The N fingers are allocated to different multipath components and the resultant plurality of output symbols from the fingers are collected and multiplexed via multiplexer 77 into a single symbol stream. In addition, the path search unit and RSSI unit outputs are also collected and multiplexed into the single stream. The data stream is stored in a single memory buffer 81 in memory module 80 via data transfer circuit 78 for subsequent software processing on a processor 82 comprising a demultiplexer processor 88.

In accordance with the invention, software executing on the processor 82 is operative to de-multiplex the contents of the input stream and distribute them to individual unit buffers. The symbols within the unit buffers associated with the N fingers are processed to generate an output signal, typically using Maximal Ratio Combining (MRC) techniques. Note that as in W-CDMA the received signal may comprise of a multiplicity of physical channels, the MRC output may comprise of a multiplicity of signal streams, one for each physical channel. The combined output signal is then demodulated and decoded to generate the user data output signal. Thus, the rake receiver is implemented in a combination of hardware and software.

It is important to note that the flow of data from the co-processor is continuous. Although the data may be transferred in blocks, once a block size is selected, the data is transferred continuously block by block. It is important to note that the block size is variable and may be configured differently each time slot. The output data is transferred to the memory buffers under control of the data transfer circuit 78. Once a block of data having a preset size is transferred from the co-processor to the processor memory, the data transfer circuit generates an interrupt request (IRQ) signal 84 to the processor 82. In response to the interrupt, the processor invokes the interrupt service routine. The software module running on the processor is also operative to configure the units and the multiplexer in the co-processor.

Figure 8:
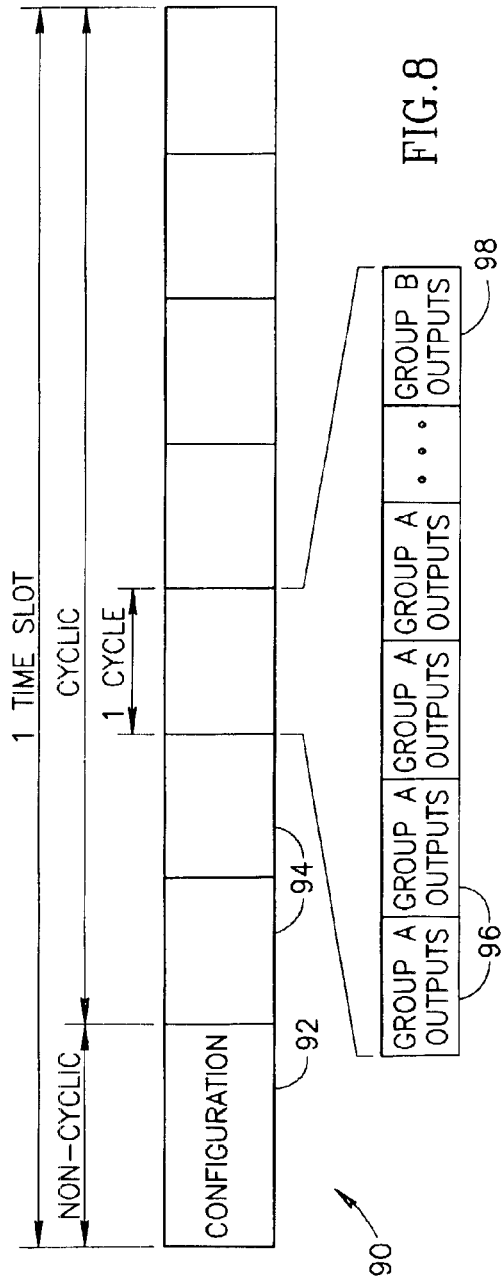
FIG. 8 is a block diagram illustrating the format of a W-CDMA time slot made up of a plurality of cycles comprising Group A and Group B data outputs.

A block diagram illustrating the format of a W-CDMA time slot made up of a plurality of cycles comprising Group A and Group B data outputs is shown in FIG. 8. In accordance with the invention, the units in the co-processor are partitioned into one or more multiplexer groups. In this example, the units are partitioned into two different groups: Group A comprising the demodulation fingers ordered from Finger0 to FingerN−1, wherein the rate of generating output symbols ranges from every 4 to 512 chips; and Group B comprising the CPICH fingers order from Finger0 through FingerN−1, the path search unit and RSSI unit in that order, wherein the rate of generating symbols is fixed at every 256 chips. Thus, the transfer rate of outputs for Group A is variable and for Group B is fixed. In this example, the path search unit is operative to generate a predefined number of symbols every 256 chips, RSSI unit generates 4 symbols every 256 chips and each pilot finger units generate 1 symbol every 256 chips.

Note that in other implementations, the output data rate of the path search unit and RSSI is not fixed but is variable. Note also that some implementations of the rake receiver may not include CPICH fingers (thus supporting UE specific beam forming) and for other implementation, a number of CPICH fingers may be used that does not match the number of dedicated channel fingers (due to different implementation of delay locked loops for multipath tap position tracking, multiple physical channels, etc.).

Since the co-processor is configured once each time slot, the majority of the input buffer, generally referenced 90, is cyclic which permits easier subsequent distribution to the unit buffers. In this example, the period of a time slot is 2560 chips when there is no configuration portion. In accordance with the standard, the period of a time slot may vary between 2560+/−376 chips. The time slot is divided into a non-cyclic portion (referenced 92) which may be 0–512 chips wide corresponding to the permitted configuration period and a cyclic portion comprising a plurality of cycles of 256 chips each (referenced 94). Typically, the time slot is 2560 chips wide and of which a 10% portion is non-cyclic and a 90% portion is cyclic. Each cycle comprises a plurality of sets of Group A symbols 96 and one set of Group B symbols 98.

Assuming the Group A rate is less than 256 chips, several sets of Group A output data are collected each cycle while only one set of Group B output data is collected since the rate of Groups B is fixed at 256 chips. The multiplexer is operative to collect the output data from the Group A units at each collection time beginning from the configured start time and then at the Group A transfer rate thereafter (i.e. every 8–256 chips). Output data is also collected beginning from the start time of Group B and every 256 chips thereafter.

In this example, each group is assigned different start times wherein the reference is the output from the most delayed finger. The reference timing is taken from the group whose output data is most time critical to the software. Typically, the output data from one of the units is more time critical than that of the others. The unit with the most time critical data serves as the reference for the multiplexer, i.e. the unit whose timely output availability is most important for the next stage processing is selected as the start time reference. Thus, in this example, it is a specific unit within Group B that causes Group B to serve as the reference for the interrupts. Actually, the occurrence of one event within Group B triggers the interrupt to the processor. Thus the occurrence of a Group B event triggers an interrupt to the processor. Typically, the group having a unit with the longest period serves as the reference since this is the slowest group. Units faster than the reference must be multiples of the slowest unit.

Note also that the software has knowledge of the structure of the single data stream, i.e. has knowledge of the number of symbols to be received in a time slot, since it is responsible for configuring the source of the data stream. Knowing the number of fingers and their transfer rates, the software can determine the number of symbols to expect. Assuming the non-cyclic portion is not included, there are 10 events of Group B. Each collection time, M Group B symbols are collected, wherein M is a positive integer. The remainder comprise Group A symbols.

Note that in the event the multiplexer needs to collect output data from both groups at the same time, the Group A outputs are given priority and should be collected first due to the higher data rate of Group A outputs. Preferably, the system does not permit the multiplexer to be configured to collect data from two groups at the same time. Note also that in the case where demodulation finger unit is assigned a lower rate than the Group A collection rate, the multiplexer collects the same output more than once. The software driver on the processor is adapted to drop any symbol duplications.

Note that the data generating unit configuration and data distribution methods are intended to be implemented in software adapted to be executed on a processor which may comprise any combination of microcontroller, microcomputer, one or more CPU cores, one or more DSP cores, one or more FPGA based processor cores, one or more ASIC based processor cores or other suitable processing elements.

Alternatively, a computer may be programmed to execute software adapted to perform the methods of FIGS. 5 and 6. It is important to note that the data transfer scheme of the present invention is not limited to the example applications presented above but may be incorporated within a communications device such as a PDA, mobile user equipment (UE) (i.e. handsets), base stations, cordless telephone, cable modem, broadband modem, laptop, PC, network transmission or switching equipment, network device or any other wired or wireless communications device.

In alternative embodiments, the data transfer scheme of the present invention may be applicable to implementations in integrated circuits, field programmable gate arrays (FPGAs), chip sets or application specific integrated circuits (ASICs), DSP circuits, wired or wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method or transferring data from a processing element to a centralized processor, said processing element having a plurality of processing units operating asynchronously from one another and generating output streams at different rates, said method comprising the steps of:

partitioning said plurality of processing units into one or more groups in accordance with each processing unit's data rate, and assigning each group a start time and a single transfer rate that is common for all processing units within a group, wherein transfer rates are assigned to groups independently of each other;

collecting data output from all processing units within each group in accordance with each group's start time and single transfer rate and multiplexing said data outputs into a single multiplexed data stream;

transferring said multiplexed data stream to a memory buffer; and extracting and distributing the contents of said memory buffer to individual unit buffers, each unit buffer associated with a different processing unit.

2. The method according to claim 1, wherein data from all processing units associated with a group are transferred at an identical rate.

3. The method according to claim 1, further comprising the step of buffering data for a processing unit if the unit operates at a rate faster than that assigned to its group.

4. The method according to claim 1, further comprising the step of repeating data for a processing unit in the event the unit operates at a rate slower than that assigned to its group.

5. The method according to claim 1, wherein the rate assigned to a group is fixed.

6. The method according to claim 1, wherein the rate assigned to a group is configurable.

7. The method according to claim 1, further comprising the step of transferring said multiplexed data stream during a configuration period whereby the demultiplexing of said data is performed using an index buffer generated by simulating the generation of said multiplexed data stream.

8. The method according to claim 1, wherein data is collected cyclically with data from each group collected during a cycle, a plurality of cycles making up a time slot.

9. The method according to claim 1, wherein said step of distributing comprises the step of extracting all data for one unit buffer from said memory buffer before extracting data for another unit buffer.

10. The method according to claim 1, wherein the step of distributing comprises the step of extracting data sequentially from said memory buffer and distributing it to a unit buffer corresponding to the data extracted.

11. The method according to claim 1, wherein one or more processing units of said processing element may be inoperative at any point in time.

12. An apparatus for transferring data from a processing element to a centralized processor, said processing element having a plurality of processing units operating asynchronously from one another and generating output streams at different rates, comprising:
- a data collector adapted to collect and multiplex data output from said plurality of processing units into a single multiplexed data stream, said plurality of processing units organized into a plurality of multiplexer groups in accordance with a start time and single transfer rate assigned to each multiplexer group and common for all processing units within a multiplexer group, wherein transfer rates are assigned to multiplexer groups independently of each other;
- a memory buffer adapted to store said multiplexed data stream;
- a data transfer unit adapted to transfer said multiplexed data stream output from said data collector to said memory buffer; and
- software operative on said centralized processor to organize the plurality of processing units into one or more multiplexer groups, each group being assigned a start time and a transfer rate, and to demultiplex and distribute the contents of said memory buffer to unit buffers, each unit buffer associated with a different processing unit.

13. The apparatus according to claim 12, wherein data from all processing units associated with a group are transferred at an identical rate.

14. The apparatus according to claim 12, further comprising means for buffering data for a processing unit if the unit operates at a rate faster than that assigned to its group.

15. The apparatus according to claim 12, further comprising means for repeating data for a processing unit in the event the unit operates at a rate slower than that assigned to its group.

16. The apparatus according to claim 12, wherein the rate assigned to a group is fixed.

17. The apparatus according to claim 12, wherein the rate assigned to a group is configurable.

18. The apparatus according to claim 12, wherein said software means is adapted to simulate the operation of said data collector and to generate an index buffer thereby, wherein said multiplexed data stream transferred to said memory buffer during a configuration period is demultiplexed using said index buffer.

19. The apparatus according to claim 12, wherein data is collected cyclically with data from each group collected during a cycle, a plurality of cycles making up a time slot.

20. The apparatus according to claim 12, wherein said centralized processor is adapted to extract all data for a unit buffer from said memory buffer before extracting data for another unit buffer.

21. The apparatus according to claim 12, wherein said centralized processor is adapted to extract data sequentially from said memory buffer and distribute it to a unit buffer corresponding to the data extracted.

22. The apparatus according to claim 12, wherein zero or more processing units of said processing element are inoperative at any point in time.

23. A Universal Mobile Terrestrial Service (UMTS) User Equipment (UE) compatible communications transceiver, comprising:
- Radio Frequency (RF) circuitry coupled to an antenna;
- an analog front-end processor coupled to said RF circuitry;
- a co-processor incorporating a plurality of processing units, operating asynchronously from one another and generating output streams at different rates, partitioned into one or more groups in accordance with each processing unit's data rate, each group having associated with it a start time and a single transfer rate that is common for all processing units within a group, wherein transfer rates are assigned to groups independently of each other, said co-processing adapted to collect and multiplex data output from all processing units within said one or more groups into a single multiplexed data stream;
- a memory buffer adapted to store said single multiplexed data stream output of said co-processor;
- data transfer circuit adapted to transfer data output from said co-processor to said memory buffer; and
- a processor programmed to demultiplex and distribute the contents of said memory buffer to unit buffers, each unit buffer associated with a different processing unit.

24. The transceiver according to claim 23, wherein the rate assigned to a group is fixed.

25. The transceiver according to claim 23, wherein the rate assigned to a group is configurable.

26. The transceiver according to claim 23, wherein said processing units comprise fingers of a rake receiver.

27. The transceiver according to claim 23, further comprising means for transferring said multiplexed data stream during a configuration period whereby the demultiplexing of said buffer contents is performed using an index buffer generated by simulating the multiplexing operation of said co-processor.

28. The transceiver according to claim 23, wherein data is collected cyclically with data from each group collected during a cycle, a plurality of cycles making up a time slot.

29. The transceiver according to claim 23, wherein said processing is adapted to demultiplex and distribute all data for one unit buffer from said memory buffer before extracting data for another unit buffer.

30. The transceiver according to claim 23, wherein the processor is adapted to demultiplex and distribute data sequentially from the memory buffer and distribute it to a unit buffer corresponding to the data extracted.

31. The transceiver according to claim 23, wherein zero or more processing units of the co-processor are inoperative at any point in time.

32. A method of data transfer between a processing element and a centralized processor in a Universal Mobile Terrestrial Service (UMTS) User Equipment (UE) compatible communications transceiver, the processing element having a plurality of processing units operating asynchronously from one another and generating output streams at different rates, the method comprising the steps of:
- partitioning said plurality of processing units in said processing element into one or more groups in accordance with each processing unit's data rate, each group assigned a start time and a single transfer rate that is common for all processing units within a group, wherein transfer rates are assigned to groups independently of each other;
- collecting and multiplexing data output from all processing units within each group in accordance with its start time and single transfer rate so as to generate a single multiplexed data stream;
- transferring said single multiplexed data stream to a memory buffer; and
- demultiplexing and distributing on said centralized processor the contents of said memory buffer to individual unit buffers, each unit buffer associated with a different processing unit.

33. The method according to claim 32, wherein the rate assigned to a group is fixed.

34. The method according to claim 32, wherein the rate assigned to a group is configurable.

35. The method according to claim 32, further comprising the step of transferring data during a configuration period whereby the demultiplexing of the contents of said memory buffer is performed using an index buffer generated by simulating the generation of the multiplexed data stream.

36. The method according to claim 32, wherein data is collected cyclically with data from each group collected during a cycle, a plurality of cycles making up a time slot.

37. The method according to claim 32, wherein said step of demultiplexing and distributing comprises demultiplexing and distributing all data for one unit buffer from said memory buffer before extracting data for another unit buffer.

38. The method according to claim 32, wherein said step of demultiplexing and distributing comprises demultiplexing and distributing data sequentially from said memory buffer and distributing it to a unit buffer corresponding to the data extracted.

39. The method according to claim 32, wherein zero or more processing units of said processing element are inoperative at any point in time.

* * * * *